W. A. RUKA, Jr.
POTATO HARVESTING MACHINE.
APPLICATION FILED FEB. 17, 1913.

1,086,563.

Patented Feb. 10, 1914.
6 SHEETS—SHEET 4.

Fig. 4

Witnesses
Robert M. Sutphen
A. D. Hind

Inventor
W. A. Ruka Jr.

By Watson E. Coleman
Attorney

W. A. RUKA, Jr.
POTATO HARVESTING MACHINE.
APPLICATION FILED FEB. 17, 1913.

1,086,563.

Patented Feb. 10, 1914.

Witnesses
Robert M. Sutphen
A. I. Hind

Inventor
W. A. Ruka Jr.

By Watson E. Coleman
Attorney

UNITED STATES PATENT OFFICE.

WILLIAM A. RUKA, JR., OF PHILLIPS, WISCONSIN.

POTATO-HARVESTING MACHINE.

1,086,563.  Specification of Letters Patent.  Patented Feb. 10, 1914.

Application filed February 17, 1913. Serial No. 748,997.

*To all whom it may concern:*

Be it known that I, WILLIAM A. RUKA, Jr., citizen of the United States, residing at Phillips, in the county of Price and State of Wisconsin, have invented certain new and useful Improvements in Potato-Harvesting Machines, of which the following is a specification, reference being had to the accompanying drawings.

This invention relates to an improved potato harvesting machine and has for its primary object to provide improved means for separating the vines from the potatoes and discharging the same from the machine in separate piles.

Another object of the invention resides in the provision of a revolving crate provided with means for positively feeding the potatoes therethrough from the front to the rear of the machine, means for revolving the crate, a plow to dig the potatoes from the ground and direct the same into the crate, and means to elevate said plow without discontinuing the operation of the crate.

A further object of the invention is to provide improved means for mounting and supporting the crate in its operative position.

Another and more specific object of the invention is to provide a wheel supported frame, a vertically disposed frame mounted upon the wheel axle, a revolving crate mounted in the latter frame, a plow carried by said frame to direct the potatoes into said crate, means for tilting the main frame to vary the depth to which the plow enters the ground, additional means for raising and lowering the vertical frame independently of the main frame, and leveling blades arranged upon opposite sides of the crate in advance of its rear end to level the soil over the furrow prior to the discharge of the potatoes.

Still another object of the invention is to generally improve and increase the efficiency of machines of this character without greatly complicating their construction or increasing the cost of manufacture.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings in which—

Figure 8:
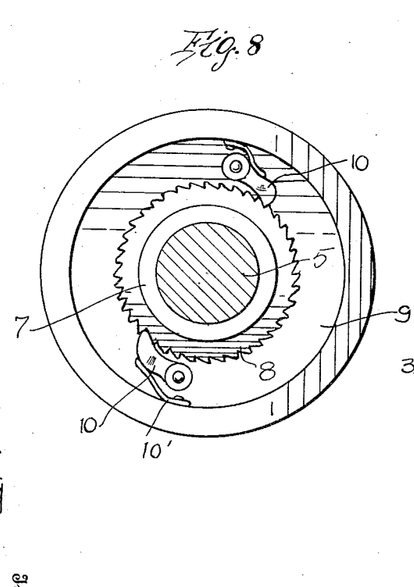
Fig. 8 is a detail section through one of the wheel hubs illustrating the means for mounting the wheels upon the supporting axle.

Referring in detail to the drawings, 5 designates the wheel shaft or axle upon the opposite ends of which the supporting wheels 6 are mounted. These wheels in the forward movement of the machine rotate the shaft or axle for the operation of the driving gearing to be later described but in the reverse or backward movement of the machine, said wheels rotate independently of the axle. To this end, I provide upon the ends of the axle 5, the collars 7 which are keyed or otherwise rigidly fixed thereto. These collars are provided with a peripheral series of ratchet teeth 8 which are located within annular recesses in the inner faces of the wheel hubs indicated at 9. In these recesses at diametrically opposite points, the dogs or pawls 10 are pivotally mounted and held in engagement with the teeth of the ratchet by the springs 10'. It will be obvious, that as these dogs extend in relatively opposite directions, that they will coöperate with the ratchet teeth on the collar 7 in the forward movement of the machine so that the shaft or axle will rotate with the wheels.

Figure 1:
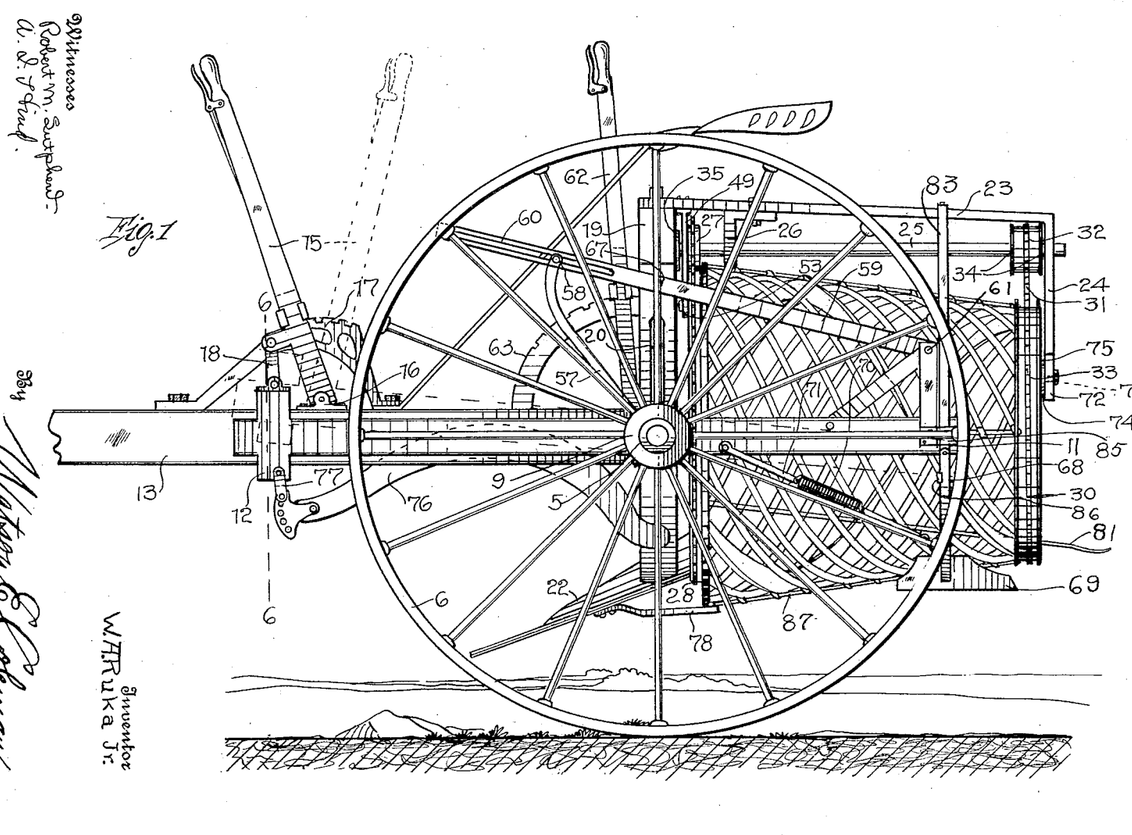
Figure 1 is a side elevation of a potato harvesting machine embodying the present invention, the same being shown in its inoperative position, the main frame being shown in one of its adjusted positions in dotted lines.
Figure 2:
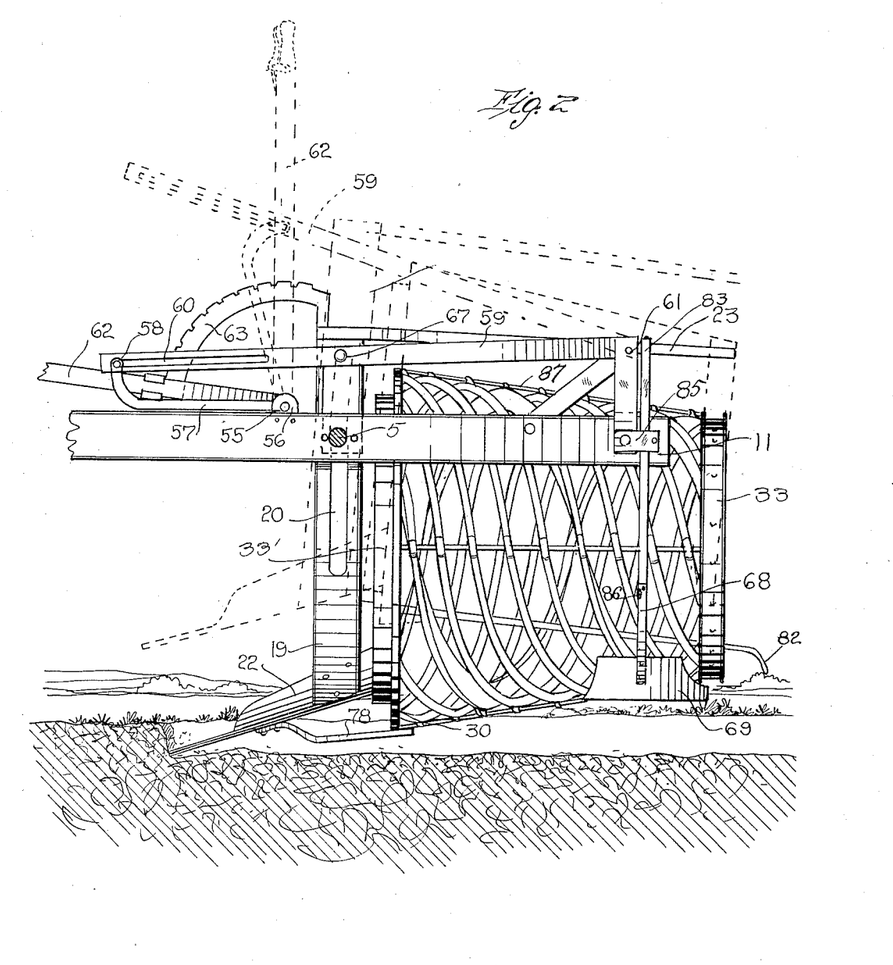
Fig. 2 is an enlarged side elevation of the crate and the adjusting means therefor, the crate and plow being shown in their elevated positions in dotted lines.
Figure 3:
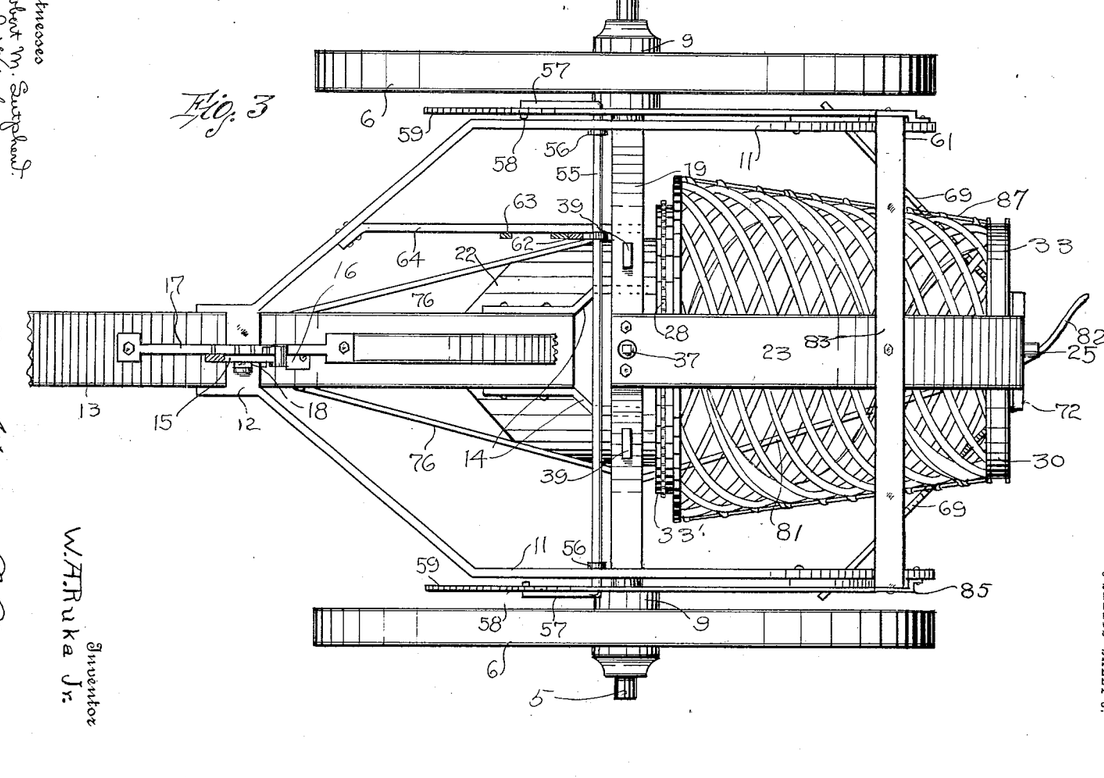
Fig. 3 is a top plan view.
Figure 4:
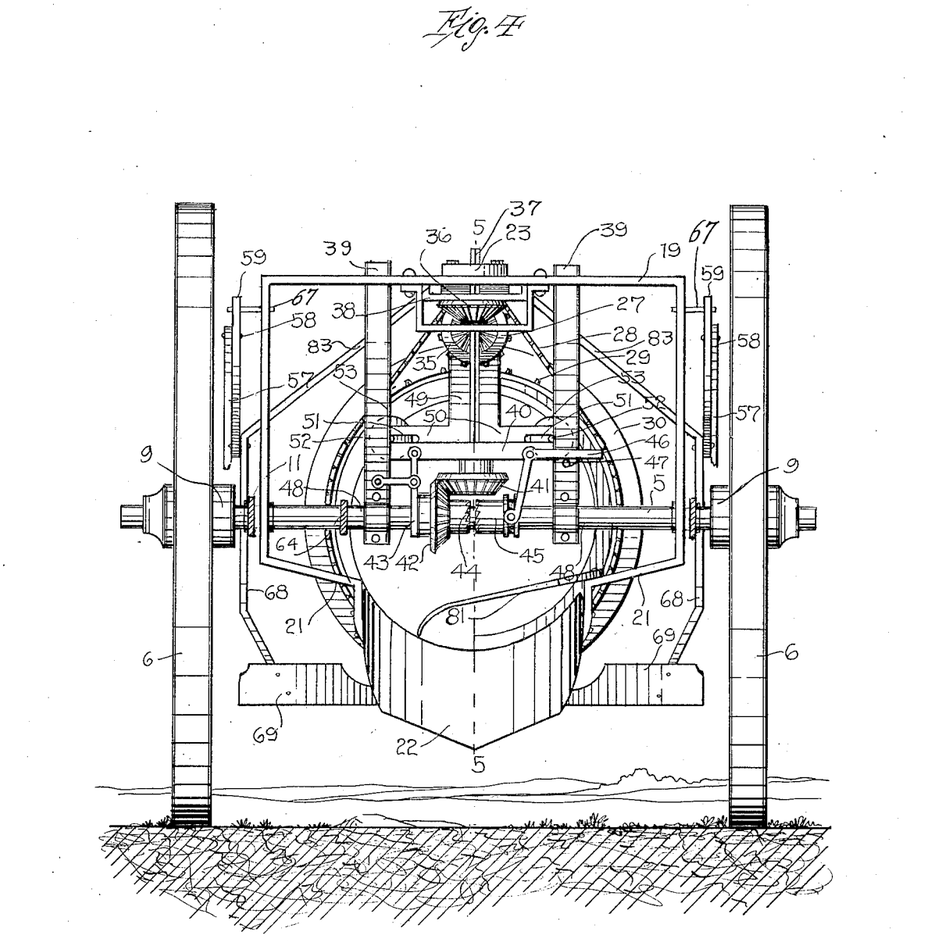
Fig. 4 is a front end elevation, certain of the parts being removed.
Figure 5:
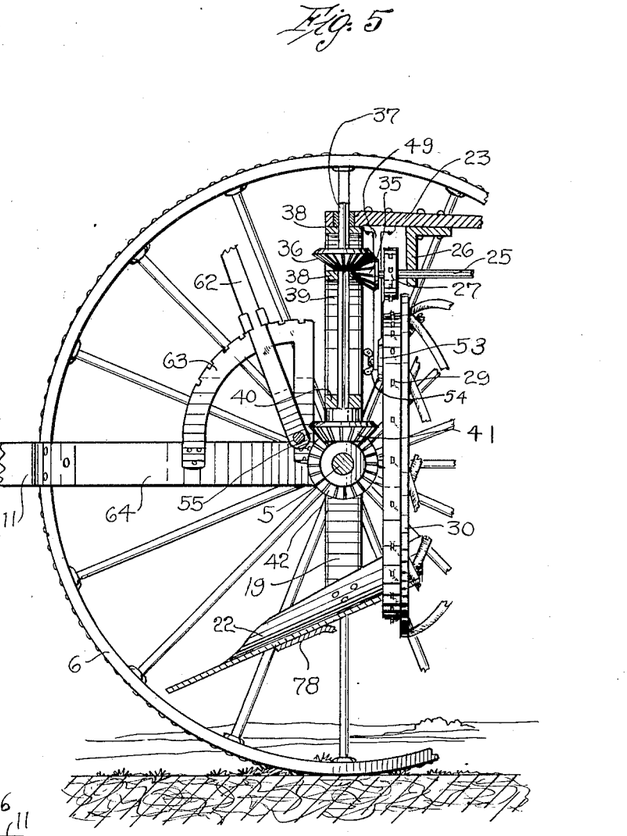
Fig. 5 is a detail section taken on the line 5—5 of Fig. 4.
Figure 6:
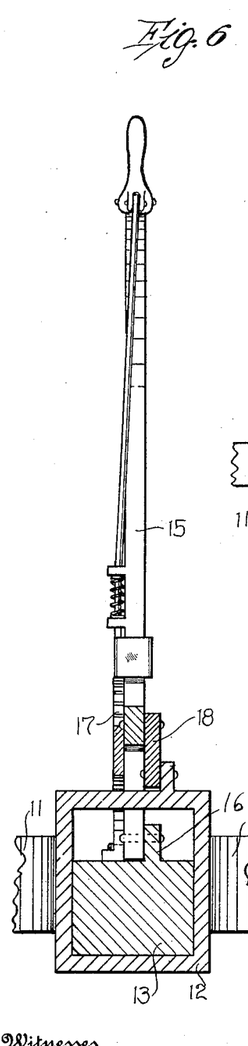
Fig. 6 is a section taken on the line 6—6 of Fig. 1.

Upon the wheel shaft or axle, the parallel longitudinal bars 11 of the main frame are loosely mounted. These bars at their forward ends are convergently disposed and are secured to opposite sides of a vertically disposed elongated loop 12 which embraces the tongue 13 of the vehicle. This vehicle tongue is secured at its rear end between the forwardly extending supporting arms 14 which are loosely mounted upon opposite sides of the center of the axle 5. The frame bars 11 are adapted to be tilted or disposed at an inclination for a purpose which will be apparent from the following description, by means of a lever 15, which is fulcrumed at its lower end upon a suitable bearing plate 16 secured to the tongue 13. This lever carries the usual spring pressed dog for engagement with the teeth of a rack bar 17 mounted upon the vehicle tongue. A link 18 connects the lever 15 with the loop 12. It will be apparent that by means of this construction, when the operator moves the lever 15 backwardly to the dotted line position shown in Fig. 1, the loop 12 will be moved upwardly upon the tongue 13 and thereby raise or elevate the forward ends of the frame bars 11 and correspondingly lower the rear ends thereof.

Between the longitudinally extending bars 11 of the main frame, an arched bar 19 is disposed, the vertical arms or standards of said bar being provided with longitudinal slots 20 to receive the axle or shaft 5 of the machine. The lower ends of these vertical arms extend below the vehicle axle and are inwardly and downwardly disposed as indicated at 21. Between the lower ends of said bar, the forwardly projecting plow blade or digger 22 is riveted or otherwise rigidly secured. It will be noted from reference to Fig. 1 that this plow blade is angularly disposed so that it will readily enter and plow a furrow in the soil in the forward movement of the machine. To the center of the transversely disposed intermediate portion of the upright bar 19, the forward end of a longitudinally and rearwardly extending bar 23 is secured. This bar is slightly inclined downwardly to its rear end and terminates in a vertically disposed bearing arm 24 in which one end of a longitudinal shaft 25 is journaled. The forward end of this shaft is mounted and supported in an angular bracket 26 fixed to the under side of the bar 23. Upon this forward end of the shaft 25, a sprocket wheel 27 is keyed or otherwise secured and is traversed by an endless chain 28 which extends around the annular series of sprocket teeth 29 provided upon the forward end of a revoluble crate 30. This crate tapers longitudinally and at its rear end is supported by means of a chain or other flexible element 31. This chain passes around a small flanged pulley 32 mounted on the rear end of the shaft 25 and around a flanged rim or annular band 33 on the rear end of the crate 30. Stop collars 34 are arranged on the shaft 25 upon opposite sides of the pulley 32 and prevent said pulley from shifting longitudinally on the shaft.

Motion is transmitted to the shaft 25 for the operation of the revolving crate through the medium of a beveled pinion 35 fixed upon the forward end of said shaft. With this pinion, a beveled gear 36 which is slidably mounted upon the upper end of a perpendicular rectangular shaft 37, meshes. This shaft is loosely disposed through coinciding openings in the upright frame bar 19 and the forward end of the bar 23. Spaced plates 38 are secured to the under side of the transverse portion of the bar 19. Between these plates the beveled gear 36 is arranged. It will thus be apparent that when the frame 19 is elevated by means of the mechanism to be later set forth in detail, the gear 36 will be moved with the pinion on the end of the shaft 25 so that they are retained in mesh and the revolution of the crate continued after the plow blade has been elevated.

Upon the wheel axle 5, an upright frame is mounted, said frame consisting of parallel vertical side bars 39 which are loosely mounted at their lower ends upon the axle. These side bars are integrally connected by means of a transverse bar 40 in which the lower end of the perpendicular shaft 37 is journaled. Upon the lower end of this shaft below the bar 40, a beveled pinion 41 is secured. This pinion meshes with a beveled gear 42 which is loosely mounted upon the wheel axle. This latter gear is held in mesh with the gear 41 by means of a yoke 43 which embraces the hub of the gear, said yoke being fixed to the frame bars 39 and 40. The gear 42 is provided with clutch teeth 44 for engagement by the teeth on a sliding clutch head 45 which is keyed upon the wheel axle. This movable clutch head is shifted through the medium of a bell crank lever 46 which is fulcrumed upon the cross bar 40 of the upright frame, said lever being provided upon its lower end with a suitable yoke, the arms of which are connected to the clutch head. With the other arm of this lever, a pin 47 mounted in one of the vertical bars 39 is adapted to engage to hold said lever against movement and retain the clutch head 45 either in or out of engagement with the clutch 44 of the gear 42. Stop collars 48 are fixed upon the wheel axle 5 upon opposite sides of the upright frame to prevent longitudinal shifting movement of said frame upon the axle.

To the forward end of the longitudinal bar 23, a depending arm 49 is secured, said arm serving as additional means of support for the forward end of the shaft 25. The lower end of this depending arm is provided with oppositely disposed transversely extending arms 50 which are longitudinally slotted as indicated at 51. In these slots, the stub shafts 52 of the rollers 53 are mounted. These shafts are adapted to be secured in their adjusted positions by means of suitable wing nuts 54. The rollers 53 engage the forward annular band of the crate and serve to support the same. When these rollers are moved toward the center of the machine, the crate will lower and take up the slack in the chain, and when said rollers are moved outwardly, the crate is raised to slacken the same. The rear supporting rollers to be later referred to are adjustable in a similar manner.

Upon the longitudinal frame bars 11 and in advance of the wheel axle 5, a rock shaft 55 is mounted in suitable bearings 56. Upwardly extending crank arms 57 are provided at opposite ends of this shaft and are provided with pins 58 for movement in longitudinal slots 60 formed in the levers 59. These levers are pivotally mounted at their rear ends upon suitable supports 61 fixed to the rear ends of the longitudinal bars 11. An operating lever 62 is secured at its lower end upon the rock shaft 55 and is provided with a spring pressed dog for engagement with the teeth of a rack 63 which is fixed to a longitudinal bar 64 secured at its forward end to one of the frame bars 11 and loosely mounted at its rear end upon the wheel axle. Pins 67 are secured to the vertical arms of the arched bar 19 and are loosely disposed in openings provided in the lever bars 59. It will be apparent, that by means of this construction, the upright arched bar 19 carrying the plow blade 22 may be elevated to an inoperative position by manipulating the lever 62 to rock the shaft 55, thereby swinging the crank arms at the ends of said shaft upwardly to the position shown in Fig. 1. The forward ends of the lever bars 59 are thereby elevated and through the medium of the pins 67, the arched frame bar 19 is raised. This frame bar is provided with openings through which the vertical bars 39 of the central stationary frame are loosely disposed, said openings serving as guides for said vertical bars. In this upward movement of the bar 19, the beveled gear 36 is also moved upwardly upon the shaft 37 and remains engaged with the beveled pinion 35 on the shaft 25 as previously explained to continue the rotation of the crate 30.

To the rear ends of the bar 11, clamping devices indicated at 85 are attached and through these clamps, the ends of an inverted U shaped bar 83 are disposed. Upon the extremities of this U shaped bar at each side of the machine, the upper end of a bar 68 is pivotally mounted. The intermediate portion of the bar 83 is rigidly secured to the longitudinal bar 23 and at the extremities of the bar 83, the same is provided with stop lugs indicated at 86 to limit the movement of the bars 68 in one direction.

To the lower ends of the bars 68, the scrapers or leveling blades 69 are secured. The blades 69 are adapted to move over the surface of the ground and spread the soil at opposite sides of the furrow made by the plow blade 22. It will be observed that the blades 69 are located in advance of the rear open end of the crate 30, so that the potatoes when discharged from the crate will fall upon a level surface and will not be covered by a loose soil. These leveling blades 69 are yieldingly held in their operative positions by means of the heavy coil springs 70 which connect the opposed ends of the rod sections 71, said rod sections being pivotally connected at their other ends to the standards 68 and the frame bars 11 respectively. Thus, should the blades 69 strike a rock or other obstruction, they may pass over the same without greatly injuring the blades.

The vertically disposed bearing arm 24 formed on the rear end of the longitudinal bar 23 has a transversely disposed bar 72 secured thereto which is provided at each end with a longitudinal slot 73. In these slots, the shafts of the rollers 74 are adjustably mounted in a similar manner to the forward roller shafts 52. The rollers 74 engage the inner surface of the annular band or rim 33 at the rear end of the crate, and are provided with flanges 75 to hold said crate in position and prevent rearward longitudinal movement thereof. The forward rollers 53 are also provided with flanges for engagement with the annular band at the forward end of the crate, whereby said crate is held against longitudinal forward movement.

Arched draft beams 76 are pivotally attached at their rear ends to the lower ends of the frame bar 19 and are provided at their forward ends with suitable clevises for the attachment of the draft animals thereto. These forward ends of the beams are loosely connected by means of links 77 to the forward ends of the longitudinal bars 11. It will therefore be apparent, that in the tilting movement of the main frame, the frame bar 19 carrying the plow blade 22 is also moved so that the plow blade will be disposed in the desired position and the depth to which the same enters the soil thus regulated.

Figure 7:
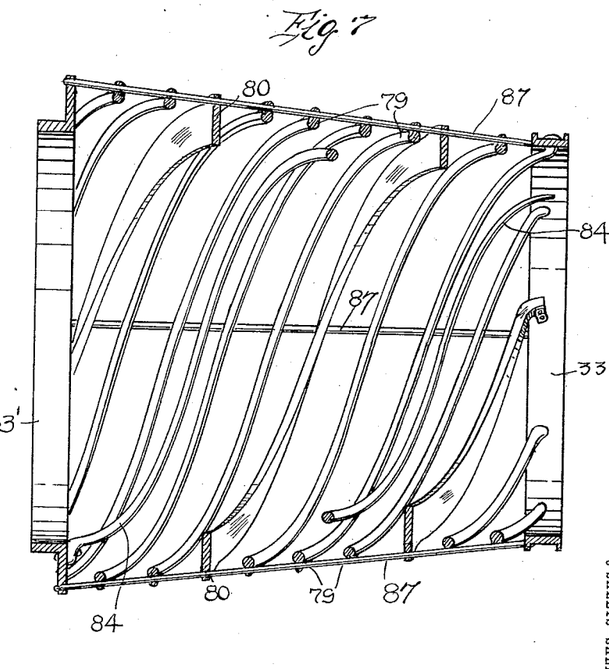
Fig. 7 is an enlarged vertical section through the revolving crate.

As a protection for the lower forward edge of the revolving crate, I provide a heavy metal plate 78 which is fixed to the under side of the plow blade 22 and extends rearwardly therefrom. This plate deflects such obstructions as may be encountered in the movement of the machine and prevents the same from contacting with and injuring the crate. I have also devised a very novel construction of the revolving crate 30, the same being more clearly illustrated in Fig. 7 of the drawings. Referring thereto 33 indicates the annular band at the rear end of the crate and 33' a similar rim or band at the forward end of the crate. These bands are provided with sprocket teeth for engagement by the driving chains. The front and rear rims or bands are connected by means of a plurality of spirally twisted rods 79 and a series of comparatively wide flat metal plates 80 are arranged in spaced relation to said rods, said plates projecting inwardly from the rods and owing to their spiral conformation acting in the nature of a screw to feed the potatoes entering the forward end of the crate through the same and discharge them from the rear end thereof. An additional rod 84 is provided in the crate, the forward end thereof being fixed to the front end band 33' of the crate. This rod is disposed inwardly of the rods 79 and extends in spiral parallel relation thereto and in spaced relation to the spiral plates or blades 80. The rear end of the rod 84 is free or unattached so that said rod may vibrate. The soil and potatoes move through the crate between the spiral rods 79 and beneath the rod 84, said latter rod and the spiral plates or blades 80 carrying vines and grass through the crate to the rear end thereof, where the same are directed to one side of the machine, by the rod 81. A plurality of rods 87 connect the annular bands 33 and 33' at opposite ends of the crate and also extend through openings provided in the outer edges of the spiral blades 80 and the rods 79 to brace the same and hold them in proper spaced relation. These rods, however, do not contact with the rod 84. It will be obvious that any desired number of the rods 84 may be provided, said rods being arranged intermediate of the turns of the spiral blades 80.

In order to segregate the vines and other refuse matter which may be dug up by the plow blade, and enter with the potatoes into the forward end of the crate, I provide a longitudinally extending rod 81, the forward end of which is fixed to one end of the frame bar 19. The rear end of this tine which is disposed at the discharge end of the crate is laterally curved or bent as indicated at 82, and is adapted to deflect the vines and discharge the same from the rear end of the crate at one side of the center thereof. The potatoes being heavier, will fall through the spaces below the tine 81 and upon the rods 79 and will accumulate in the lower central portion of the crate. As the crate is revolved, the wide spiral metal plates 80 carry the potatoes longitudinally through the crate and discharge the same therefrom at a different point from the discharge point of the vines. When the potatoes are discharged from the crate, they are practically free of soil which clings thereto, said soil sifting through the spaces between the rods 79 of the crate by the agitation of the potatoes therein as the crate is revolved. In this manner, it will be seen that the potatoes are automatically cleaned and relieved of such refuse matter as ordinarily adheres thereto and as the surface upon which they are deposited has been previously leveled in the manner above described, no further cleaning thereof will be necessary when the potatoes are gathered.

A suitable operator's seat is of course mounted upon the tongue of the vehicle and is disposed in position for the convenient operation of the levers 15 and 62 by the operator.

From the foregoing, it is believed that the construction and manner of operation of my improved potato harvesting machine will be fully understood. The plow blade or digger may be vary easily and quickly moved by the operator to its elevated or inoperative position without disturbing the position of the drive gear 36 with relation to the gear 35, thus insuring the continued operation of the revolving crate. The machine as a whole is of comparatively simple construction, is highly efficient and positive in operation and may be produced at small manufacturing cost. The machine is capable of harvesting the potatoes in large quantities in a minimum length of time. It will of course, be apparent that such a machine is capable of embodiment in practicable form without adhering to the detail structural features thereof as illustrated in the accompanying drawings, and I therefore reserve the right to make such alterations and modifications in the construction and arrangement of the several elements employed as may be deemed advisable without departing from the spirit of the invention or sacrificing any of its advantages except as defined in the appended claims.

Having thus described the invention, what is claimed is:

1. In a machine of the character described, the combination with a wheel supported tiltable frame, a second frame mounted upon the wheel axle for vertical movement, a plow blade carried by said latter frame, a revoluble crate mounted in said frame, means driven from the wheel axle for operating said crate, draft beams connecting the vertically movable frame with the forward end of the main frame, and means for tilting the main frame upon the vehicle axle to vary the depth to which the plow blade enters the ground.

2. In a machine of the character described, a wheel supported axle, a horizontally disposed main frame loosely mounted upon said axle, a second frame vertically movable upon the wheel axle, a plow blade carried by the latter frame, a revoluble crate mounted in said frame, means for raising or lowering said latter frame, means driven from the wheel axle for actuating said crate in either position of the frame, and draft beams connecting said vertically movable frame with the horizontal main frame.

3. In a machine of the character described, a wheel supported vertically movable frame, a crate revolubly mounted in said frame and open at its front and rear ends, a digging plow mounted in said frame and extending into the forward end of the crate, means for actuating said crate, means arranged in advance of the rear end of the crate to level the surface of the soil, and means for elevating the frame to dispose the plow blade in an inoperative position.

In testimony whereof I hereunto affix my signature in the presence of two witnesses.

WILLIAM A. RUKA, Jr.

Witnesses:
C. F. GLISSENDORF,
HENRY NIEBAUER.

Copies of this patent may be obtained for five cents each, by addressing the "Commissioner of Patents, Washington, D. C."